United States Patent
Nefzger et al.

(10) Patent No.: US 8,334,035 B2
(45) Date of Patent: Dec. 18, 2012

(54) POLYESTER POLYOLS FROM TEREPHTHALIC ACID AND OLIGOALKYLENE OXIDES

(75) Inventors: Hartmut Nefzger, Pulheim (DE); Erika Bauer, Jüchen (DE); Uwe Kuenzel, Leverkusen (DE); Jürgen Schloβmacher, Bergheim (DE); Lutz Brassat, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 13/263,144

(22) PCT Filed: Mar. 27, 2010

(86) PCT No.: PCT/EP2010/001950
§ 371 (c)(1),
(2), (4) Date: Nov. 11, 2011

(87) PCT Pub. No.: WO2010/115532
PCT Pub. Date: Oct. 14, 2010

(65) Prior Publication Data
US 2012/0052228 A1 Mar. 1, 2012

(30) Foreign Application Priority Data
Apr. 9, 2009 (EP) .................... 09005229

(51) Int. Cl.
| B29D 22/00 | (2006.01) |
| B29D 23/00 | (2006.01) |
| B32B 1/08  | (2006.01) |
| B65D 39/00 | (2006.01) |

(52) U.S. Cl. ......... 428/36.5; 428/36.9; 560/60; 521/172
(58) Field of Classification Search .................. 428/36.5, 428/36.9; 560/60; 521/172
See application file for complete search history.

(56) References Cited

U.S. PATENT DOCUMENTS
| 4,039,487 A | 8/1977 | Kolakowski et al. |
| 4,469,824 A | 9/1984 | Grigsby, Jr. et al. |
| 5,003,027 A | 3/1991 | Nodelman |

FOREIGN PATENT DOCUMENTS
| EP | 1834974 A2 | 9/2007 |
| GB | 2234253 | * 7/1990 |
| WO | 99/54380 | 10/1999 |

* cited by examiner

*Primary Examiner* — Michael C Miggins
(74) *Attorney, Agent, or Firm* — Lyndanne M. Whalen

(57) ABSTRACT

Polyester polyols are produced by reacting terephthalic acid with a glycol corresponding to the formula H—(OCH$_2$CH$_2$)$_n$—OH and an aliphatic dicarboxylic acid. These polyester polyols are particularly useful for the production of polyurethane) (PUR) and polyurethane/polyisocyanurate (PUR/PIR) foams for use in insulation applications.

16 Claims, No Drawings

POLYESTER POLYOLS FROM TEREPHTHALIC ACID AND OLIGOALKYLENE OXIDES

The present invention relates to polyester polyols from terephthalic acid and oligoalkylene oxides, a process for the production thereof and their use for the production of PUR/PIR rigid foams.

Nowadays PUR/PIR rigid foams are mainly produced on the basis of polyester polyols, since these have a positive influence on the flame resistance of the PUR/PIR rigid foams and on their thermal conductivity. The raw materials primarily used in the production of polyester polyols are succinic acid, glutaric acid, adipic acid, phthalic acid/phthalic anhydride, terephthalic acid and isophthalic acid. In addition to polyester polyols, polyether polyols are also added on occasion to improve the solubility performance of pentanes in respect of the polyester polyols or to reduce the brittleness of the isocyanurate-containing PUR/PIR rigid foams.

In this connection U.S. Pat. No. 4,039,487 describes polyester polyols which can be obtained from polyethylene glycols with equivalent weights of 75 to 225 g/mol and aromatic polycarboxylic acids. The incorporation of small amounts of aliphatic polycarboxylic acids is not considered.

EP-A 1 834 974 is similarly restricted to aromatic polycarboxylic acids, and U.S. Pat. No. 5,003,027 is restricted moreover to the processing of the polyester polyols in a RIM process.

Although WO-A 99/54380 also discloses the use of aliphatic dicarboxylic acids to produce polyester polyols, it still uses polyethylene glycol terephthalates (PET) as the source of the aromatic dicarboxylic acid. However, the general disadvantage of such a process, which is based on recycled material, is its potential contamination with foreign materials, which in some cases have to be removed by laborious means.

U.S. Pat. No. 4,469,824 is likewise based on recycled PET, with adipic acid being proposed as one of the further reaction components.

The use of aromatic acids, in particular the use of terephthalic acid, in the production of polyester polyols can however mean that the polyester polyols are solid at room temperature, making them more difficult to work with in technical processes.

However, no specific handling instructions are disclosed in the prior art which would make it possible to produce a polyester polyol which meets all important processing parameters in the area of PUR/PIR rigid foams.

Furthermore, many conventional PUR/PIR rigid foams based on polyester polyols do not exhibit adequate flame resistance, since they generally only comply with fire class B3 as defined in DIN 4102-1.

An object of the present invention was therefore to provide polyester polyols which when used in PUR/PIR rigid foams lead to improved flame resistance and in particular lead to PUR/PIR rigid foams which comply with fire class B2 as defined in DIN 4102-1 and/or with the SBI test (DIN EN 13823).

A further object of the present invention was to provide polyester polyols which are easy to work with in technical processes in the production of PUR/PIR rigid foams and which at the same time lead to improved flame resistance.

The object according to the invention is achieved by the provision of a polyester polyol produced from a mixture comprising (A) terephthalic acid, optionally in the form of a $C_1$-$C_4$ alkyl ester,
(B) oligoethylene glycol of the formula H—$(OCH_2CH_2)_n$—OH with a number-average number of oxyethylene groups n in the range between 3.0 and 9.0, and
(C) at least one aliphatic dicarboxylic acid selected from the group consisting of succinic acid, glutaric acid, adipic acid, sebacic acid, suberic acid, azelaic acid, decane dicarboxylic acid, dodecane dicarboxylic acid and omega-hydroxycaproic acid, characterised in that the polyester polyol produced has a concentration of ether groups in the range between 9.0 mol/kg polyester polyol and 16 mol/kg polyester polyol.

A $C_1$-$C_4$ alkyl ester of terephthalic acid is preferably an ester selected from the group consisting of terephthalic acid dimethyl ester, terephthalic acid diethyl ester, terephthalic acid di-n-butyl ester and terephthalic acid diisobutyl ester.

Within the meaning of the present invention a compound of the general formula $$H—(OCH_2CH_2)_n—OH \text{ with}$$

n=1 has one oxyethylene group and no ether group;
n=2 has two oxyethylene groups and one ether group;
n=3 has three oxyethylene groups and two ether groups;
n=4 has four oxyethylene groups and three ether groups;
n=5 has five oxyethylene groups and four ether groups;
n=6 has six oxyethylene groups and five ether groups;
n=7 has seven oxyethylene groups and six ether groups;
n=8 has eight oxyethylene groups and seven ether groups; and
n=9 has nine oxyethylene groups and eight ether groups.

Component (B) is preferably a mixture of various oligomeric ethylene glycols, the value n indicating the average number of oxyethylene groups in component (B). Component (B) particularly preferably contains less than 8 wt. % of oligomers with n=2, most particularly preferably less than 3 wt. %. This can therefore also result in non-integer values for the value n, such as for example 3.1, 3.2 or 3.24.

Oligoethylene glycols (B) preferably have number-average molecular weights in the range from 145 to 450 g/mol, particularly preferably in the range from 150 to 250 g/mol.

The polyester polyol produced preferably has an amount of ether groups in the range between 9.1 mol/kg polyester polyol and 13 mol/kg polyester polyol.

The mixture includes at least one aliphatic dicarboxylic acid (C) selected from the group consisting of succinic acid, glutaric acid, adipic acid, sebacic acid, suberic acid, azelaic acid, decane dicarboxylic acid, dodecane dicarboxylic acid and omega-hydroxycaproic acid, The mixture particularly preferably includes at least one aliphatic dicarboxylic acid (C) selected from the group consisting of succinic acid, glutaric acid and adipic acid.

Component (A) is preferably present in an amount from 10 to 40 wt. %, particularly preferably in an amount from 15 to 35 wt. %, relative to the total amount of the mixture to produce the polyester polyol according to the invention.

Component (B) is preferably present in an amount from 60 to 90 wt. %, particularly preferably in an amount from 55 to 85 wt. %, relative to the total amount of the mixture to produce the polyester polyol according to the invention.

Component (C) is preferably present in an amount from 0 to 20 wt. %, particularly preferably 2 to 20 wt. %, most highly preferably in an amount from 3 to 15 wt.%, most particularly preferably in an amount from 5 to 14 wt. %, relative to the total amount of the mixture to produce the polyester polyol according to the invention.

Surprisingly it was found that the incorporation of component (C) with an otherwise identical formulation and unchanged hydroxyl value of the polyester polyol advantageously brings about a reduced viscosity of the polyester polyol.

The polyester polyol preferably has a hydroxyl value in the range between 100 mg KOH/g and 400 mg KOH/g, particularly preferably in the range between 110 mg KOH/g and 220 mg KOH/g, most particularly preferably in the range between 150 mg KOH/g and 200 mg KOH/g.

The OH value is determined by first reacting the hydroxyl end groups with a defined excess of an anhydride, for example acetic anhydride, in a sample of the polyester polyol, hydrolysing the excess anhydride and determining the content of free carboxyl groups by direct titration with a strong base, for example sodium hydroxide. The difference between carboxyl groups introduced in the form of the anhydride and the carboxyl groups found by experimentation is a measure of the number of hydroxyl groups in the sample. If this value is corrected by the number of carboxyl groups contained in the original sample as a result of incomplete esterification, i.e. by the acid value, then the OH value is obtained. The titrations, which are mostly performed with sodium hydroxide, are converted into the equivalent amount of potassium hydroxide, so the acid and hydroxyl values have the dimension g KOH/kg. The following mathematical correlation exists here between the hydroxyl value (OH#) and the number-average molecular weight (M): $M=(56100*F)/OH\#$. F denotes here the number-average functionality and can be derived from the formulation in a good approximation. The method of determining the OH value is described for example in Houben Weyl, Methoden der Organischen Chemie, vol. XIV/2 Makromolekulare Stoffe, p. 17, Georg Thieme Verlag; Stuttgart 1963.

The molar masses of the polyester polyols according to the invention are preferably in the range from 280 to 1120 Da, particularly preferably from 510 to 1020 Da, most particularly preferably from 560 to 750 Da.

The polyester polyol according to the invention preferably has an acid value in the range from 0.1 KOH/g to 4 mg KOH/g, particularly preferably in the range from 0.2 KOH/g to 2.8 KOH/g.

The method of determining the acid value is described for example in Houben Weyl, Methoden der Organischen Chemie, vol. XIV/2 Makromolekulare Stoffe, p. 17 f., Georg Thieme Verlag; Stuttgart 1963.

The polyester polyol according to the invention preferably has a viscosity measured in accordance with DIN 53019 in the range between 800 mPas and 4500 mPas, particularly preferably in the range between 1000 mPas and 3000 mPas, at 25° C.

The oligoethylene glycol (B) preferably has a number-average number of oxyethylene groups n in the range between 3.1 and 9, particularly preferably in the range between 3.5 and 8.

The polyester polyol preferably has a melting point in the range between −40° C. and 25° C., particularly preferably in the range between −20 and 23° C.

The polyester polyol according to the invention is preferably produced from a mixture comprising terephthalic acid (A) and oligoethylene glycol (B) of the formula H—$(OCH_2CH_2)_n$—OH with a number-average number of oxyethylene groups n in the range from 3.0 to 9.0, and at least one aliphatic dicarboxylic acid (C) selected from the group consisting of succinic acid, glutaric acid and adipic acid.

The present invention also provides a process for producing the polyester polyols according to the invention, wherein components (A) and (B), preferably in the presence of a catalyst selected from the group consisting of tin(II) salts and titanium tetraalkoxylates, are reacted at a temperature in the range between 160° C. and 240° C. and under a pressure in the range between 1 and 1013 mbar for a time in the range between 7 and 100 hours.

All catalysts known to the person skilled in the art can be used to produce the polyester polyols according to the invention. Tin(II) chloride and titanium tetraalkoxylates are preferably used. The use of tin dichloride dihydrate is particularly preferred in proportions of 20 to 200 ppm, most particularly 45 to 80 ppm, relative to all components used.

The reaction of the components to produce the polyester polyol according to the invention preferably takes place in bulk.

The present invention also provides a process for producing a PUR or PUR/PIR foam comprising the following steps:
a) reaction of at least one polyester polyol according to the invention with
b) at least one polyisocyanate-containing component,
c) at least one blowing agent,
d) at least one or more catalysts,
e) optionally at least one flame retardant and/or further auxiliary substances and additives,
f) optionally at least one compound having at least two isocyanate-reactive groups.

The conventional aliphatic, cycloaliphatic and in particular aromatic diisocyanates and/or polyisocyanates are suitable as the polyisocyanate-containing component. Toluylene diisocyanate (TDI), diphenylmethane diisocyanate (MDI) and in particular mixtures of diphenylmethane diisocyanate and polyphenylene polymethylene polyisocyanates (polymer MDI) are preferably used. The isocyanates can also be modified, for example by the incorporation of uretdione, carbamate, isocyanurate, carbodiimide, allophanate and in particular urethane groups. Polymer MDI is used in particular to produce polyurethane rigid foams. In the prior art isocyanurate formation takes place almost exclusively during the foaming reaction and leads to flame-retardant PUR/PIR foams which are preferably used in technical rigid foam, for example in the construction industry as insulating sheets, sandwich elements and truck bodies.

Compounds which are described in general terms below can generally be used as compounds having at least two isocyanate-reactive groups, in other words at least two hydrogen atoms which react with isocyanate groups.

Suitable compounds having at least two isocyanate-reactive groups are in particular those bearing two or more reactive groups selected from OH groups, SH groups, NH groups, $NH_2$ groups and CH-acid groups, such as for example β-diketo groups, in the molecule. Compounds having 2 to 8 OH groups are used in particular to produce the polyurethane rigid foams preferably produced by the process according to the invention. Polyether polyols and/or polyester polyols are preferably used. In the production of polyurethane rigid foams the hydroxyl value of the polyether polyols and/or polyester polyols used is preferably 25 to 850 mg KOH/g, particularly preferably 25 to 450 mg KOH/g; the molecular weights are preferably greater than 400 g/mol. Component (f) preferably contains polyether polyols produced by known processes, for example by anionic polymerisation with alkali hydroxides such as sodium or potassium hydroxide or alkali alcoholates such as sodium methylate, sodium or potassium ethylate or potassium isopropylate as catalysts and with the addition of at least one starter molecule containing 2 to 8, preferably 2 to 6 reactive hydrogen atoms in bonded form, or by cationic polymerisation with Lewis acids such as inter alia antimony pentachloride, boron fluoride etherate or bleaching earth as catalysts, from one or more alkylene oxides with 2 to 4 carbon atoms in the alkylene radical. The polyether polyols can moreover be produced by double metal cyanide catalysis, wherein a continuous mode of operation is also possible.

Suitable alkylene oxides are for example tetrahydrofuran, 1,3-propylene oxide, 1,2- or 2,3-butylene oxide, styrene oxide and preferably ethylene oxide and 1,2-propylene oxide. The alkylene oxides can be used individually, alternately one after another, or as mixtures. Suitable starter molecules are for example glycerol, trimethylolpropane, pentaerythritol, sucrose, sorbitol, methylamine, ethylamine, isopropylamine, butylamine, benzylamine, aniline, toluidine, toluenediamine, naphthylamine, ethylenediamine, diethylenetriamine, 4,4'-methylenedianiline, 1,3-propanediamine, 1,6-hexanediamine, ethanolamine, diethanolamine, triethanolamine and other dihydric or polyhydric alcohols which can themselves also be oligoether polyols or monovalent or polyvalent amines.

Component (f) can optionally also contain polyester polyols, chain extenders and/or crosslinking agents. Difunctional or trifunctional amines and alcohols in particular can be used as chain extenders and/or crosslinking agents, in particular diols and/or triols with molecular weights of less than 400 g/mol, preferably from 60 to 300. Polyether polyols and/or polyester polyols having a hydroxyl value greater than 160, particularly preferably greater than 200 mg KOH/g, and particularly preferably a functionality between 2.9 and 8 are preferably used as compound (f). Polyether polyols having an equivalent weight, i.e. molecular weight divided by functionality, of less than 400 g/mol, preferably less than 200 g/mol, are particularly preferably used as isocyanate-reactive compounds (f). The compound (f) is generally in liquid form.

Hydrocarbons are preferably used as the blowing agent component (c). These can be used mixed with water and/or other physical blowing agents. These are understood to be compounds which are dissolved or emulsified in the substances used for polyurethane production and which evaporate under the conditions of polyurethane formation. Examples include hydrocarbons, halogenated hydrocarbons and other compounds, such as for example perfluorinated alkanes, such as perfluorohexane, chlorofluorocarbons, as well as ethers, esters, ketones and/or acetals.

The blowing agent component (c) is preferably used in an amount from 2 to 45 wt. %, preferably 4 to 30 wt. %, particularly preferably 5 to 20 wt. %, relative to the total weight of components (b) to (f). In a preferred embodiment the blowing agent mixture (c) contains hydrocarbons, in particular n-pentane and/or cyclopentane and water. Particularly preferred hydrocarbons are n-pentane, cyclopentane, isopentane and/or mixtures of isomers. Cyclopentane and/or n-pentane in particular are used as the blowing agent (c).

The conventional and known polyurethane or polyisocyanurate forming catalysts are used as catalysts (d) for producing the polyurethane or polyisocyanurate foams according to the invention, for example organic tin compounds, such as tin diacetate, tin dioctoate, dibutyl tin dilaurate, and/or strongly basic amines such as 2,2,2-diazabicyclooctane, triethylamine or preferably triethylene diamine, N,N-dimethylcyclohexylamine or bis(N,N-dimethylaminoethyl)ether, as well as potassium acetate, potassium octoate and aliphatic quaternary ammonium salts to catalyse the PIR reaction.

The catalysts are preferably used in an amount from 0.05 to 3 wt. %, preferably 0.06 to 2 wt. %, relative to the total weight of all components.

The reaction of the aforementioned components optionally takes place in the presence of (e) additives, such as for example flame retardants, fillers, cell regulators, foam stabilisers, surface-active compounds and/or stabilisers to prevent oxidative, thermal or microbial degradation or ageing, preferably flame retardants and/or foam stabilisers. Substances which promote the formation of a regular cell structure in foam formation are referred to as foam stabilisers. The following are cited by way of example: silicone-containing foam stabilisers, such as siloxane-oxyalkylene mixed polymers and other organopolysiloxanes, also alkoxylation products of fatty alcohols, oxo alcohols, fatty amines, alkyl phenols, dialkyl phenols, alkyl cresols, alkyl resorcinol, naphthol, alkyl naphthol, naphthylamine, aniline, alkylaniline, toluidine, bisphenol A, alkylated bisphenol A, polyvinyl alcohol, as well as moreover alkoxylation products of condensation products of formaldehyde and alkyl phenols, formaldehyde and dialkyl phenols, formaldehyde and alkyl cresols, formaldehyde and alkyl resorcinol, formaldehyde and aniline, formaldehyde and toluidine, formaldehyde and naphthol, formaldehyde and alkyl naphthol as well as formaldehyde and bisphenol A. Ethylene oxide, propylene oxide, poly-THF and higher homologues for example can be used as alkoxylation reagents.

The flame retardants known from the prior art can be used in general as flame retardants. Suitable flame retardants are for example brominated ethers (e.g. Ixol® B251), brominated alcohols such as dibromoneopentyl alcohol, tribromoneopentyl alcohol and PHT-4-diol as well as chlorinated phosphates such as for example tris-(2-chloroethyl)phosphate, tris-(2-chloroisopropyl)phosphate (TCPP), tris(1,3-dichloroisopropyl)phosphate, tris-(2,3-dibromopropyl)phosphate and tetrakis-(2-chloroethyl) ethylene diphosphate. In addition to the halogen-substituted phosphates already mentioned, inorganic flame retardants can also be used to render the PUR or PUR/PIR rigid foams produced according to the invention flame resistant, such as red phosphorus, preparations containing red phosphorus, aluminium oxide hydrate, antimony trioxide, ammonium polyphosphate and calcium sulfate or cyanuric acid derivatives, such as for example melamine or mixtures of at least two flame retardants, such as for example ammonium polyphosphates and melamine as well as optionally starch. Diethyl ethanephosphonate (DEEP), triethyl phosphate (TEP), dimethyl propylphosphonate (DMPP), diphenyl cresyl phosphate (DPK) and others can be used as further liquid halogen-free flame retardants. In the context of the present invention the flame retardants are preferably used in an amount from 0 to 30 wt. %, particularly preferably 2 to 25 wt. %, in particular 2.5 to 3.5 wt. %, relative to the total weight of components (b) to (e).

Further details of the aforementioned and other starting materials can be found in the specialist literature, for example in Kunststoffhandbuch, vol. VII, Polyurethane, Carl Hanser Verlag Munich, Vienna, 1st, 2nd and 3rd edition 1966, 1983 and 1993.

To produce the polyurethane rigid foams the polyisocyanates (b) and components (a) and optionally (1) are reacted in amounts such that the isocyanate index is 90 to 600, preferably 150 to 500, particularly preferably 180 to 450.

The polyurethane rigid foams can be produced discontinuously or continuously by means of known processes. Familiar to the person skilled in the art are inter alia slabstock foam production (continuous and discontinuous), use in one-component systems (discontinuous) and in insulating foam moulding (discontinuous). The invention described here relates to all processes, but preferably to the continuous twin-belt process, wherein flexible and/or rigid materials can be used as outer layers.

The polyurethane rigid foams according to the invention preferably have a closed-cell content greater than 90%, particularly preferably greater than 95%.

The PUR or PUR/PIR foams according to the invention preferably have a density of 28 g/m³ to 300 g/m³, particularly preferably 30 g/m³ to 50 g/m³.

The polyurethane rigid foams according to the invention are used in particular for heat insulation, for example of refrigerators, containers or buildings, for example in the form of insulated pipes, sandwich elements, insulating sheets or refrigerators.

Polyurethanes within the meaning of the present patent application are also understood to include polymeric isocyanate adducts which in addition to urethane groups also contain further groups such as are formed for example by the reaction of the isocyanate group with itself, for example isocyanurate groups, or by the reaction of the isocyanate groups with groups other than hydroxyl groups, the cited groups mostly being present in the polymer together with the urethane groups.

The present invention further provides the use of polyester polyols produced by the process described above to produce polyurethane. Polyurethane is a versatile material that is used in many areas. Owing to the great variety of raw materials which can be used, products having very diverse properties can be produced, for example rigid foams for insulation, flexible slabstock foams for mattresses, flexible moulded foams for car seats and seat cushions, acoustic foams for sound insulation, thermoplastic foams, shoe foams or microcellular foams, but also compact casting systems and thermoplastic polyurethanes.

The invention is clarified below by means of examples.

EXAMPLES

| Composition of the raw materials used in the examples | |
|---|---|
| Technical glutaric acid | Lanxess; molar mass approx. 134 Da |
| Terephthalic acid | Interquisa |
| Phthalic anhydride (PA): | Technical PA from Lanxess |
| PEG 200 | BASF |
| PEG 180 | Ineos |
| Ethylene glycol (EG): | EG from Ineos |
| Tin(II) chloride dihydrate | Aldrich |
| Titanium tetrabutylate | Aldrich |
| Equipment used: | |
| Viscometer: | MCR 51 from Anton Paar |
| Analytical methods used: | |
| Hydroxyl value: | According to Houben Weyl, Methoden der Organischen Chemie, vol. XIV/2 Makromolekulare Stoffe, p.17, Georg Thieme Verlag; Stuttgart 1963. |
| Acid value: | According to Houben Weyl, Methoden der Organischen Chemie, vol. XIV/2 Makromolekulare Stoffe, p.17 f., Georg Thieme Verlag; Stuttgart 1963. |

A) Production of the Polyester Polyols

Example 1

According to the Invention 2280 g (11.4 mol) of PEG 200 were placed in a 4-litre four-necked flask, fitted with a heating mantle, mechanical stirrer, internal thermometer, 40-cm packed column, still head, descending jacketed coil condenser and diaphragm vacuum pump, under a nitrogen blanket at 100° C. 732 g (4.41 mol) of terephthalic acid were stirred in over the course of approximately 5 minutes and 83 mg of tin dichloride dihydrate were added. The mixture was heated for 2 hours at 230° C., during which time water was distilled off and the turbidity of the reaction mixture disappeared. 314 g (2.34 mol) of technical glutaric acid were then added and the mixture was heated for a further 90 minutes at 230° C. Then a further 83 mg of tin dichloride dihydrate were added and a vacuum was applied, ultimately of 30 mbar. The mixture was allowed to condense under these conditions for a further 5.5 hours. The mixture was cooled and the following properties were determined:

Analysis of the Polyester:

| | |
|---|---|
| Hydroxyl value: | 160 mg KOH/g |
| Acid value: | 2.0 mg KOH/g |
| Viscosity: | 1620 mPas (25° C.), 310 mPas (50° C.), 110 mPas (75° C.) |

Examples 2-9(C)

The procedure of Example 1 was repeated using the materials indicated in Table 1 in the amounts indicated in Table 1.

The properties of the polyester polyols produced are also reported in Table 1.

TABLE 1

Composition and properties of polyester polyols according to the invention and not according to the invention

| Example: | | 1 | 2 | 3(C) | 4(C) | 5(C) | 6(C) | 7(C) | 8 | 9(C) |
|---|---|---|---|---|---|---|---|---|---|---|
| Terephthalic acid | [g] | 732 | 999 | 1052 | 1204 | 1112 | 1052 | 887 | 2465 | |
| PEG 200 | [g] | 2280 | | 2176 | 1341 | 1499 | 1302 | 967 | 5263 | 2191 |
| PEG 180 | [g] | | 2041 | | | | | | | |
| Technical glutaric acid | [g] | 314 | 160 | | 325 | 333 | 505 | | 919 | 104 |
| Ethylene glycol | [g] | | | | 471 | 387 | 505 | 644 | 552 | |
| PA | [g] | | | | | | | 791 | | 834 |
| Tin dichloride dihydrate | [mg] | 160 | 160 | 160 | | | | | | 64 |
| Titanium tetrabutylate | [mg] | | | | 235 | 235 | 235 | 235 | 610 | |
| Hydroxyl value | [mg KOH/g] | 160 | 159 | 159.7 | 160 | 160 | 160 | 155.5 | 162.7 | 159.9 |
| Acid value | [mg KOH/g] | 2.0 | 1.9 | 0.2 | 0.2 | 0.2 | 0.3 | 0.4 | 1.5 | 0.5 |
| Viscosity, 25° C. | [mPas] | 1620 | 3510 | 2750 | solid | solid | solid | solid | 3030 | 1960 |
| Proportion of terephthalic acid relative to all components | [wt. %] | 22.0 | 31.2 | 32.6 | 35.9 | 33.4 | 31.3 | 27.0 | 28.2 | 0 |
| Proportion of ether groups from oligoethylene glycol | [mol/kg ester] | 11.6 | 10.4 | 11.4 | 7.0 | 7.8 | 6.8 | 5.1 | 9.8 | 11.5 |

TABLE 1-continued

Composition and properties of polyester polyols according to the invention and not according to the invention

| Example: | | 1 | 2 | 3(C) | 4(C) | 5(C) | 6(C) | 7(C) | 8 | 9(C) |
|---|---|---|---|---|---|---|---|---|---|---|
| Proportion of ethylene glycol | [wt. %] | 0 | 0 | 0 | 14.1 | 11.6 | 15.0 | 19.6 | 6.3 | 0 |
| Proportion of PA | [wt. %] | 0 | 0 | 0 | 0 | 0 | 0 | 24.0 | 0 | 26.6 |

C = comparative example

Example 3(C) is not in accordance with the invention because no component (C) (in the case of these examples technical glutaric acid) is used in its production. Example 4(C) is not in accordance with the invention because the proportion of ether groups from oligoethylene glycols is below 9 mol/kg ester and because the proportion of components which are not (A), (B) or (C) is above 10 wt. %; in this specific case 14.1 wt. % of ethylene glycol is used. The same applies to examples 5(C), 6(C) and 7(C). Table 1 shows furthermore that polyester polyols 4(C), 5(C), 6(C) and 7(C) not according to the invention are disadvantageously solid at room temperature whereas polyester polyols 1, 2, 3 and 8 according to the invention are advantageously liquid. Example 9(C) satisfies this criterion but contains no terephthalic acid, which incidentally is disadvantageous with regard to fire behaviour.

Raw Materials for PUR/PIR Rigid Foams
   a.) Polyester from examples 1, 2, 3, 8, 9(C)
   Foam additives, consisting of b.) to d.):
     b.) Crosslinker from Evonik
     c.) Tegostab, stabiliser from Evonik
     d.) DMCHA, N,N-dimethylcyclohexylamine from Rheinchemie
   e.) TCPP, tris(1-chloro-2-propyl) phosphate from Lanxess
   f.) n-Pentane, Kraemer & Martin
   g.) Water, demineralised
   h.) Activator: Desmorapid VP.PU 1792, Bayer MaterialScience
   i.) Desmodur VP.PU 44V40L, polyisocyanate from Bayer MaterialScience Examples 10-16(C)

Foams were produced by reacting the materials listed in Table 2 in the amounts listed in Table 2. The properties of the foams produced are reported in Table 2.

TABLE 2

Composition and properties of polyester polyol-based PUR/PIR foams according to the invention and not according to the invention

| Example | | 10 | 11 | 12 | 13 | 14(C) | 15 | 16(C) |
|---|---|---|---|---|---|---|---|---|
| Polyol from Ex. 2 | [g] | 90.0 | | 90.0 | | | | |
| Polyol from Ex. 1 | [g] | | 90.0 | | 90.0 | | | |
| Polyol from Ex. 3(C) | [g] | | | | | 90.0 | | |
| Polyol from Ex. 8 | [g] | | | | | | 91.0 | |
| Polyol from Ex. 9(C) | [g] | | | | | | | 96.0 |
| Foam additives | [g] | 2.4 | 2.4 | 12.3 | 12.3 | 12.3 | 2.4 | 12.3 |
| TCPP | [g] | 15.0 | 15.0 | 15.0 | 15.0 | 15.0 | 15.0 | 15.0 |
| Water | [g] | 1.1 | 1.1 | 1.1 | 1.1 | 1.1 | 1.2 | 1.1 |
| Desmorapid 1792 | [g] | 2.6 | 2.6 | 2.5 | 2.5 | 2.5 | 2.6 | 2.5 |
| n-Pentane | [g] | 17.0 | 17.0 | 17.0 | 17.0 | 17.0 | 17.0 | 18.0 |
| Desmodur 44V40 L | [g] | 200 | 200 | 200 | 200 | 200 | 200 | 200 |
| Index | | 354 | 352 | 239 | 239 | 239 | 340 | 232 |
| Properties: | | | | | | | | |
| Finished core density | [kg/m$^3$] | 34.1 | 33.7 | 34.0 | 34.1 | 34.7 | 33.3 | 33.3 |
| Setting time | [s] | 43 | 40 | 28 | 27 | 24 | 44 | 27 |
| Tack-free time | [s] | 90 | 68 | 55 | 40 | 35 | 90 | 40 |
| Adhesion after 24 h | [rating] | 1 | 2 | 1-2 | 1 | 1 | 2 | 1 |
| Single flame source test class | | B2 | B2 | B2 | B2 | B2 | B2 | B3 |
| Flame height Ø | [mm] | 115 | 105 | 120 | 123 | 120 | 115 | 154 |
| Dimensional stability: | [%, x-direction] | −0.1 | 0.1 | 0.1 | −0.3 | 0.0 | −0.1 | −0.1 |
| Storage for 24 h | [%, y-direction] | −0.1 | 0.0 | −0.2 | −0.1 | −0.2 | −0.1 | 0.0 |
| at −22° C. | [%, z-direction] | 0.0 | 0.0 | 0.0 | 0.1 | 0.1 | 0.0 | 0.0 |
| Dimensional stability: | [%, x-direction] | −0.1 | −0.1 | 0.1 | −0.3 | 0.3 | −0.7 | −0.6 |
| Storage for 24 h at 80° C. | [%, y-direction] | 0.0 | 0.4 | 0.4 | 0.3 | −0.1 | −0.3 | −0.4 |
| | [%, z-direction] | −0.5 | −0.5 | 0.0 | −0.4 | −0.1 | −0.6 | −0.3 |

Index refers to the molar ratio of all isocyanate groups to all Zerewitinoff-active hydrogen atoms.

On the laboratory scale all raw materials of the rigid foam formulation apart from the polyisocyanate component are weighed into a cardboard beaker, heated to 23° C., mixed with a Pendraulik laboratory mixer (e.g. model LM-34 from Pendraulik) and volatilised blowing agent (pentane) is optionally added. Then the polyisocyanate component (likewise heated to 23° C.) was added to the polyol mixture while stirring, this was intensively mixed and the reaction mixture was poured into wooden moulds lined with paper. The setting time and the tack-free time were determined during the foaming process. After 24 hours cube-shaped specimens with an edge length of 9 cm were cut out of the foam preform.

The following properties were determined:

| | |
|---|---|
| Dimensional stability: | Determined by establishing the change in dimensions of cube-shaped specimens after being stored for 24 hours at −22° C. and +80° C. Foams according to the invention exhibit relative changes in length in each spatial direction of at most 1% (absolute). |
| Core density: | Determined from the volume and weight of a cut-out cube-shaped specimen. |
| Single flame source test: | Single flame source test as defined in DIN 4102-1. Rigid foams according to the invention comply with fire class B2. |
| Adhesion: | Determined by slowly drawing the foamed paper insert away from the foam by hand. The adhesion is rated from 1 (very good) to 6 (unsatisfactory), a rating of 1 meaning that the paper cannot be drawn away from the foam and tears, whereas with 6 there is no adhesion between the paper and foam. |
| Setting time: | Determined by dipping a wooden stick into the reacting polymer melt and removing it again. Characterises the time at which the polymer melt hardens. |
| Tack-free time: | Characterises the nature of the surface of the foam. It is determined by tapping the foam with a wooden stick once it has finished rising. The time at which it stops sticking is referred to as the tack-free time. |

Table 2 shows that all foams according to the invention achieve fire class B2, whereas foam 16(C) fails even though it contains the same amount of flame retardant TCPP.

What is claimed is:

1. A polyester polyol having a concentration of ether groups of from 9.0 mol/kg polyester polyol to 16 mol/kg polyester polyol, which is produced by reacting a mixture comprising
   (A) terephthalic acid,
   (B) an oligoethylene glycol of the formula H—(OCH$_2$CH$_2$)$_n$—OH with a number-average number of oxyethylene groups n of from 3.0 to 9.0, and
   (C) at least one aliphatic dicarboxylic acid selected from the group consisting of succinic acid, glutaric acid, adipic acid, sebacic acid, suberic acid, azelaic acid, decane dicarboxylic acid, dodecane dicarboxylic acid and omega-hydroxycaproic acid.

2. The polyester polyol of claim 1 in which component (A) is present in an amount of from 10 to 40 wt. %, relative to the total weight of the mixture.

3. The polyester polyol of claim 1 in which component (B) is present in an amount of from 90 to 60 wt. %, relative to the total weight of the mixture.

4. The polyester polyol of claim 1 in which component (C) is present in an amount of from 2 to 20 wt. %, relative to the total weight of the mixture.

5. The polyester polyol of claim 1 in which the polyester polyol has a hydroxyl value of from 100 mg KOH/g to 400 mg KOH/g.

6. The polyester polyol of claim 1 in which the polyester polyol has a viscosity measured in accordance with DIN 53109 of from 800 mPas to 4500 mPas at 25° C.

7. The polyester polyol of claim 1 in which the oligoethylene glycol (B) has a number-average number of oxyethylene groups n in the range between 3.1 and 9.

8. The polyester polyol of claim 1 to in which the polyester polyol has a melting point between −40° C. and 25° C.

9. A process for producing the polyester polyol of claim 1 in which components (A), (B) and (C) are reacted in the presence of a catalyst selected from the group consisting of tin(II) salts and titanium tetraalkoxylates at a temperature from 160° C. to 240° C. and under a pressure of from 1 to 1013 mbar for from 7 to 100 hours.

10. A PUR or PUR/PIR foam produced by reacting the polyester polyol of claim 1 with a polyisocyanate.

11. A process for producing a PUR or PUR/PIR foam comprising reacting:
   a) the polyester polyol of claim 1 with
   b) at least one polyisocyanate-containing component,
   c) at least one blowing agent,
   d) at least one catalysts,
   e) optionally at least one flame retardant, auxiliary substance or additive, and
   f) optionally at least one compound having at least two isocyanate-reactive groups.

12. The PUR or PUR/PIR foam produced by the process of claim 11.

13. An insulated pipe produced with the PUR or PUR/PIR foam of claim 12.

14. A sandwich element produced with the PUR or PUR/PIR foam of claim 12.

15. An insulating sheet produced with the PUR or PUR/PIR foam of claim 12.

16. A refrigerator produced with the PUR or PUR/PIR foam of claim 12.

* * * * *